United States Patent
Jeon et al.

(10) Patent No.: US 12,401,832 B2
(45) Date of Patent: Aug. 26, 2025

(54) METHOD AND APPARATUS FOR VIDEO CODING USING INTRA SUB-PARTITIONS FOR CHROMA BLOCK

(71) Applicants: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

(72) Inventors: Byeung Woo Jeon, Seongnam-si (KR); Jee Yoon Park, Seoul (KR); Bum Yoon Kim, Yongin-si (KR); Seung Wook Park, Yongin-si (KR)

(73) Assignees: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 39 days.

(21) Appl. No.: 18/369,553

(22) Filed: Sep. 18, 2023

(65) Prior Publication Data
US 2024/0007681 A1   Jan. 4, 2024

Related U.S. Application Data

(63) Continuation of application No. PCT/KR2022/003788, filed on Mar. 17, 2022.

(30) Foreign Application Priority Data

Mar. 19, 2021   (KR) .................. 10-2021-0035971
Mar. 16, 2022   (KR) .................. 10-2022-0032588

(51) Int. Cl.
  H04N 19/96   (2014.01)
  H04N 19/176   (2014.01)
  (Continued)

(52) U.S. Cl.
  CPC ........... *H04N 19/96* (2014.11); *H04N 19/176* (2014.11); *H04N 19/186* (2014.11); *H04N 19/46* (2014.11)

(58) Field of Classification Search
  None
  See application file for complete search history.

(56) References Cited

U.S. PATENT DOCUMENTS 11,122,299 B2   9/2021   Wang et al.
11,750,807 B2   9/2023   Chernyak et al.
(Continued)

FOREIGN PATENT DOCUMENTS

KR   20180075422 A   7/2018
KR   20200072553 A * 11/2020
(Continued)

OTHER PUBLICATIONS

International Search Report and Written Opinion cited in corresponding international app No. PCT/KR2022/003788; Jun. 17, 2022; 10 pp.

*Primary Examiner* — Kaitlin A Retallick
(74) *Attorney, Agent, or Firm* — Lempia Summerfield Katz LLC

(57) ABSTRACT

A method and an apparatus for video coding using intra sub-block prediction of a chroma block are disclosed. The video coding method and the apparatus adaptively apply a sub-block split method, transmission information, and a transform method in performing intra prediction on chroma signals of a current block using an intra sub-partitions (ISP) mode.

13 Claims, 18 Drawing Sheets

(51) Int. Cl.
*H04N 19/186* (2014.01)
*H04N 19/46* (2014.01)

(56) References Cited

U.S. PATENT DOCUMENTS

| | | |
|---|---|---|
| 2020/0374516 A1 | 11/2020 | Heo et al. |
| 2020/0404333 A1 | 12/2020 | Wang et al. |
| 2021/0084309 A1* | 3/2021 | Zhao .................... H04N 19/186 |
| 2021/0377570 A1 | 12/2021 | Wang et al. |
| 2021/0385450 A1* | 12/2021 | Chernyak ............ H04N 19/103 |
| 2022/0248012 A1 | 8/2022 | Chernyak et al. |
| 2022/0295061 A1* | 9/2022 | Zhang .................... H04N 19/12 |
| 2024/0283910 A1* | 8/2024 | Ko ......................... H04N 19/11 |

FOREIGN PATENT DOCUMENTS

| | | |
|---|---|---|
| KR | 20210011458 A | 2/2021 |
| WO | 2020180216 A2 | 9/2020 |
| WO | 2020216288 A1 | 10/2020 |

\* cited by examiner

□ : Current block  ⌐ ¬ : Sub-block

☐ chroma block

--- Split structure of luma block

☐ chroma block

--- Split structure of luma block

☐ chroma block

--- Split structure of luma block

☐ chroma block

--- Split structure of luma block

☐ Sub-block

Current block　　 Sub-block

METHOD AND APPARATUS FOR VIDEO CODING USING INTRA SUB-PARTITIONS FOR CHROMA BLOCK

CROSS-REFERENCE TO RELATED APPLICATIONS

This application is a Continuation of International Application No. PCT/KR2022/003788 filed on Mar. 17, 2022, which claims priority to Korean Patent Application No. 10-2021-0035971 filed on Mar. 19, 2021, and Korean Patent Application No. 10-2022-0032588 filed on Mar. 16, 2022, the entire disclosures of each of which are incorporated herein by reference.

TECHNICAL FIELD

The present disclosure relates to a video coding method and an apparatus using intra sub-block prediction of a chroma block.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

In video encoding, when an image is split into coding units (CUs) and encoded per coding unit (CU) basis, all pixels in a coding target block are intra-predicted using one prediction mode. Therefore, since a distance from a reference pixel may be increased, a large amount of energy may still exist in residual signals to be encoded. A problem of energy existing in the residual signals may be more serious in the case of a rectangular block in which a distance between a pixel to be predicted and the reference pixel is horizontally (or vertically) long or a large block. In order to solve this problem, the block is sub-split, but there is a problem that an overhead for transmitting the intra prediction mode for each sub-split block increases.

Meanwhile, there is a technology for solving the problem of increasing overhead. In order to reduce the overhead while increasing intra prediction efficiency, a block to be encoded is evenly split into small blocks once more and prediction is performed, and only one prediction mode may be transmitted on a per original block before sub-splitting and may be commonly used for small sub-split blocks. This related art is called Intra Sub-Partitions (ISP) technology or ISP mode.

An ISP mode of the related art is applied to only luma signals and is not applied to chroma signals. Further, when the ISP mode is applied to the chroma signals, there is a problem of having to cope with various chroma formats of the chroma signals. Therefore, it is necessary to consider a method of effectively applying an ISP technology to the chroma signals in terms of coding efficiency.

SUMMARY

The present disclosure seeks to provide a video coding method and an apparatus for adaptively applying a sub-block split method, transmission information, and a transform method in performing intra prediction on chroma signals of a current block using an intra sub-partitions (ISP) mode.

At least one aspect of the present disclosure provides a method of applying intra sub-partitions (ISP) to a chroma block of a current block, performed by a video decoding apparatus. The method comprises decoding a chroma format, a chroma ISP enabled flag, and a tree type from a bitstream. The chroma format indicates relative resolution of a chroma channel with respect to a luma channel of the current block. The chroma ISP enabled flag is a flag indicating whether or not the ISP is available for the chroma block. The tree type indicates a tree split structure for decoding of the current block. The method also comprises decoding chroma ISP information of the chroma block from the bitstream according to the tree type, the chroma format, and the chroma ISP enabled flag. The method also comprises decoding sub-blocks into which the chroma block has been sub-split from the bitstream using the chroma ISP information and inversely transforming the sub-blocks.

Another aspect of the present disclosure provides a method of applying intra sub-partitions (ISP) to a chroma block of a current block, performed by a video decoding apparatus. The method comprises decoding a chroma format, an ISP enabled flag, a chroma ISP enabled flag, a separate chroma ISP flag, and a tree type from a bitstream. The chroma format indicates relative resolution of a chroma channel with respect to a luma channel of the current block. The ISP enabled flag is a flag indicating whether or not the ISP is available for a luma block of the current block. The chroma ISP enabled flag is a flag indicating whether or not the ISP is available for the chroma block. The separate chroma ISP flag is a flag indicating whether or not chroma ISP information of the chroma block is split. The tree type indicates a tree split structure for decoding the current block. The method also comprises decoding luma ISP information of the luma block from the bitstream according to the tree type and the ISP enabled flag. The method also comprises generating the chroma ISP information according to the tree type, the chroma format, the chroma ISP enabled flag, the separate chroma ISP flag, and the luma ISP information. The method also comprises decoding sub-blocks into which the chroma block has been sub-split from the bitstream using the chroma ISP information.

Yet another aspect of the present disclosure provides a method of applying intra sub-partitions (ISP) to a chroma block of a current block, performed by a video encoding apparatus. The method comprises acquiring a chroma format, a chroma ISP enabled flag, and a tree type from a high level. The chroma format indicates relative resolution of a chroma channel with respect to a luma channel of the current block. The chroma ISP enabled flag is a flag indicating whether or not the ISP is available for the chroma block. The tree type indicates a tree split structure for encoding of the current block. The method also comprises setting chroma ISP information of the chroma block according to the tree type, the chroma format, and the chroma ISP enabled flag. The method also comprises generating sub-blocks by sub-splitting the chroma block using the chroma ISP information and setting a transform method for the sub-blocks.

As described above, the present disclosure provides a video coding method and a video coding apparatus for adaptively applying a sub-block split method, transmission information, and a transform method in performing the intra prediction on the chroma signals of the current block using the ISP mode to improve the coding efficiency.

DETAILED DESCRIPTION

Figure 1:
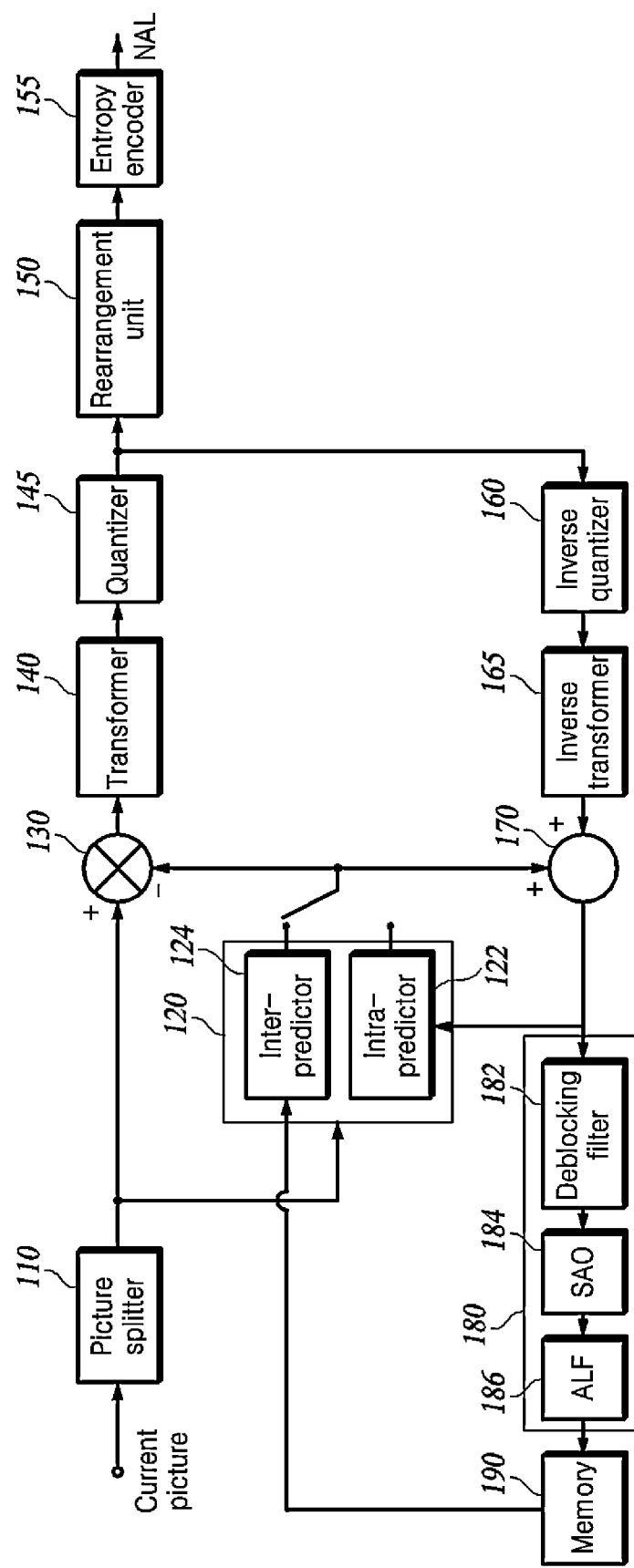
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
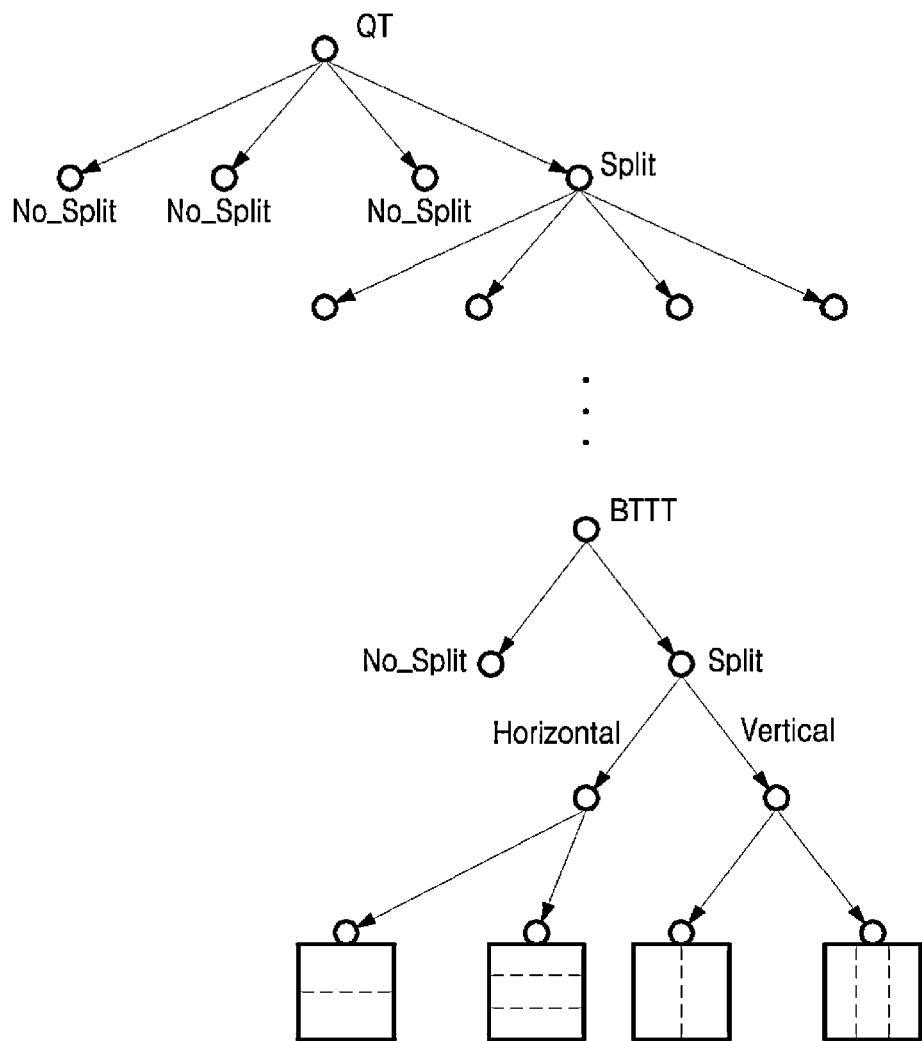
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
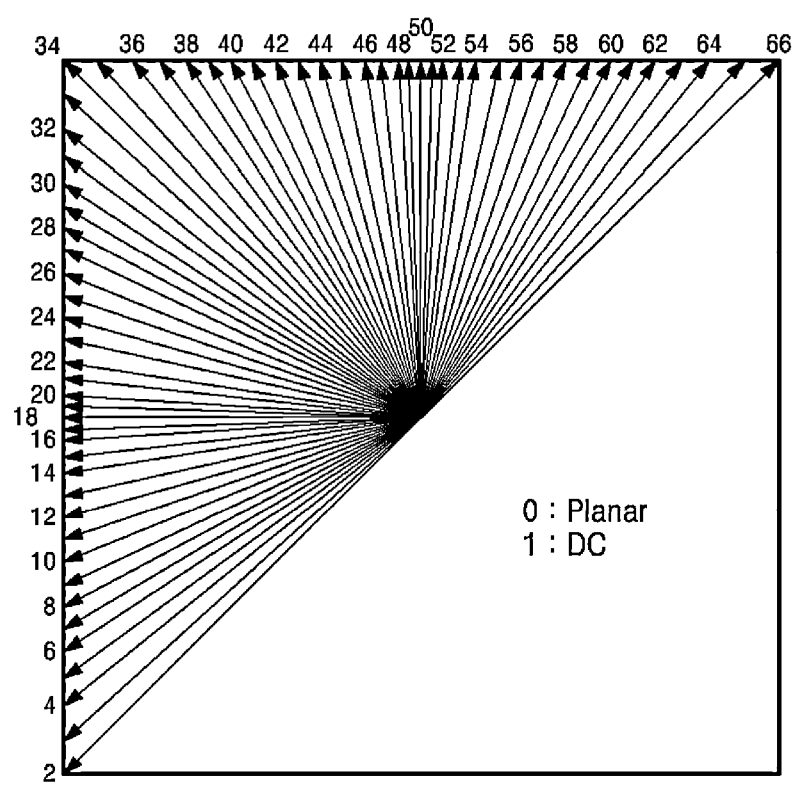
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
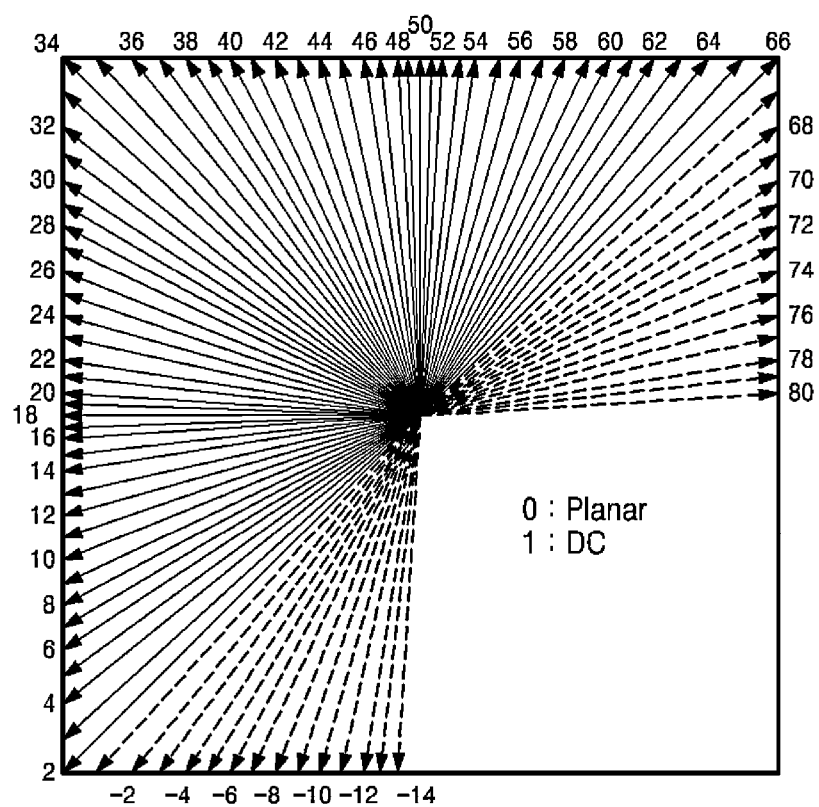

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
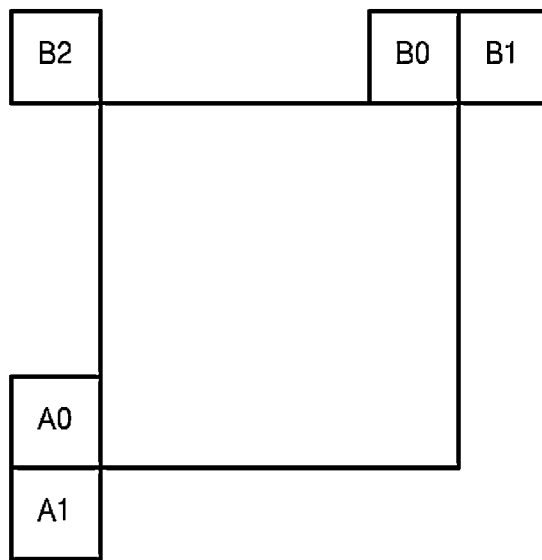
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
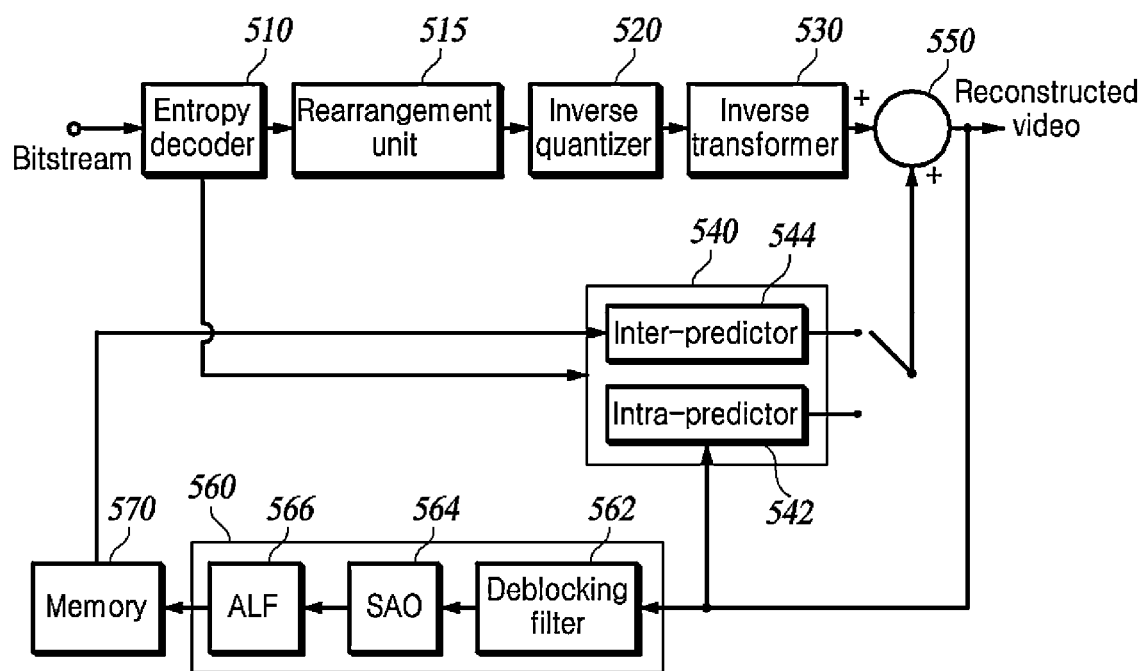
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and an apparatus for adaptively applying a sub-block split method, transmission information, and a transform method in performing intra prediction on chroma signals of a current block using an intra sub-partitions (ISP) mode.

The following embodiments may be applied to an intra predictor 122 and a transformer 140 in the video encoding apparatus. Further, the following embodiments may be applied to an entropy decoder 510, an inverse transformer 530, and an intra predictor 542 in the video decoding apparatus.

In the following description, the term 'target block' to be encoded/decoded may be used in the same meaning as the current block or coding unit (CU) as described above, or the term 'target block' may mean a partial region of the coding unit.

Hereinafter, a specific flag of true indicates that a value of the corresponding flag is 1, and the specific flag of false indicates that the value of the corresponding flag is 0.

Hereinafter, an ISP, ISP technology and ISP mode are used interchangeably.

Hereinafter, for YCbCr channels constituting a video, Y is referred to as a luma channel, and Cb or Cr is referred to as a chroma channel.

Further, a chroma block of the current block is referred to a current chroma block, and a luma block of the current block is referred to a current luma block.

I. Intra Prediction and Intra Sub-Partitions (ISP)

In the Versatile Video Coding (VVC) technology, intra prediction modes of the luma block have sub-split directional modes (i.e., 2 to 66) in addition to non-directional modes (i.e., Planar and DC), as illustrated in FIG. 3A. Further, as added to the example of FIG. 3B, the intra prediction mode of the luma block has directional modes (−14 to −1 and 67 to 80) according to wide-angle intra prediction.

As described above, a target video to be encoded is encoded on a per CU. In this case, information defining the split is expressed in a tree structure. The video encoding apparatus transmits tree information to the video decoding apparatus to indicate a shape and size of CUs into which a video is split. When the video is split into the Cus, a luma video and a chroma video may be separately split into Cus. Further, both luma signals and chroma signals may be split into the same type of Cus. In this case, a technology in which the luma block and the chroma block have different split structures is referred to as a chroma separate tree (CST) technology or a dual tree technology. When the CST technology is used, the chroma block may have a different partitioning method than the luma block. Meanwhile, a technology in which the luma block and the chroma block have the same split structure is referred to as a single tree technology. When a single tree technology is used, the chroma block has the same partitioning method as the luma block.

Meanwhile, the chroma block may also use intra prediction in sub-split directional modes in a limited manner according to the prediction direction used by the luma block. However, in the intra prediction of the chroma block, various directional modes that can be used by the luma block other than horizontal and vertical directions cannot always be used. In order to be able to use these various directional modes, a prediction mode of a current chroma block should be set to a derived mode (DM) mode. This setting of the DM mode makes it possible for the current chroma block to use directional mode other than the horizontal and vertical directions of the luma block.

Intra prediction modes that are used frequently or used most basically to maintain image quality when the chroma block is encoded include planar, dc, vertical, horizontal, and DM modes. In this case, in the DM mode, the intra prediction mode of the luma block spatially corresponding to the current chroma block is used as the intra prediction mode of the chroma block.

The video encoding apparatus may signal whether or not the intra prediction mode of the chroma block is the DM mode to the video decoding apparatus. In this case, there may be several methods for transferring the DM mode to the video decoding apparatus. For example, the video encoding apparatus may set intra_chroma_pred_mode, which is information for indicating the intra prediction mode of the chroma block to a specific value, and then may transmit intra_chroma_pred_mode to the video decoding apparatus to indicate whether or not the intra prediction mode of the chroma block is the DM mode.

When the chroma block is encoded in the intra prediction mode, the intra predictor 542 of the video decoding apparatus may set the intra prediction mode IntraPredModeC of the chroma block according to Table 1.

Hereinafter, in order to distinguish between intra_chroma_pred_mode and IntraPredModeC, which are information related to the intra prediction mode of the chroma block, these are expressed as a chroma intra prediction mode indicator and a chroma intra prediction mode, respectively.

TABLE 1

| | lumaIntraPredMode | | | | |
|---|---|---|---|---|---|
| intra_chroma_pred_mode | 0 | 50 | 18 | 1 | X (0 <= X <= 66) |
| 0 | 66 | 0 | 0 | 0 | 0 |
| 1 | 50 | 66 | 50 | 50 | 50 |

TABLE 1-continued

| | lumaIntraPredMode | | | | |
|---|---|---|---|---|---|
| intra_chroma_pred_mode | 0 | 50 | 18 | 1 | X (0 <= X <= 66) |
| 2 | 18 | 18 | 66 | 18 | 18 |
| 3 | 1 | 1 | 1 | 66 | 1 |
| 4 | 0 | 50 | 18 | 1 | X |

Here, lumaIntraPredMode is an intra prediction mode (hereinafter referred to as 'luma intra prediction mode') of the luma block corresponding to the current chroma block. lumaIntraPredMode indicates one of the prediction modes illustrated in FIG. 3A. For example, in Table 1, lumaIntraPredMode=0 indicates a planar prediction mode, and lumaIntraPredMode=1 indicates a DC prediction mode. lumaIntraPredMode of 18, 50, and 66 indicate directional modes referred to as horizontal, vertical, and VDIA, respectively. Meanwhile, intra_chroma_pred_mode=0, 1, 2, and 3 indicate planar, vertical, horizontal, and DC prediction modes, respectively. intra_chroma_pred_mode=4 indicates the DM mode, and a value of IntraPredModeC, which is a chroma intra prediction mode, is set to be equal to a value of lumaIntraPredMode.

There are several technologies for improving the coding efficiency of the intra prediction on the basis of the prediction mode of the luma block. In the ISP technology, a current block is sub-split into small blocks having the same size, and then the intra prediction mode is shared among all sub-blocks, but a transform may be applied to each sub-block. In this case, the sub-partitioning of the block may be performed in a horizontal or vertical direction.

Figure 6:
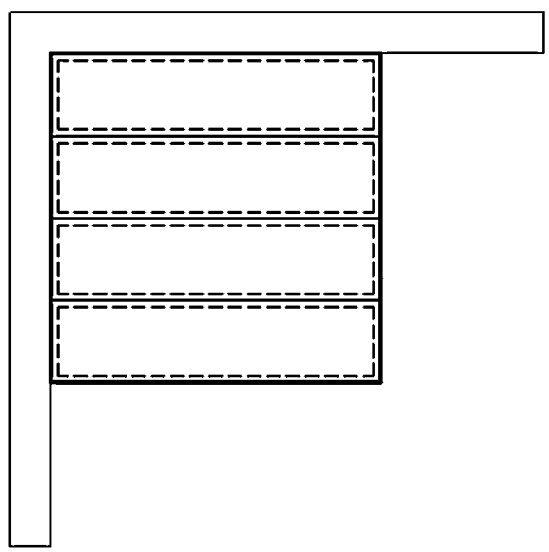
FIG. 6 is an illustrative diagram illustrating the current block and split sub-blocks.

In the following description, as illustrated in the example of FIG. 6, a large block before sub-split is referred to as a current block, and each of the sub-split small blocks is referred to as a sub-block.

An operation of the ISP technology is as follows.

The video encoding apparatus signals intra_subpartitions_mode_flag indicating whether or not to apply ISP and signals intra_subpartitions_split_flag indicating a sub-partitioning method to the video decoding apparatus. Table 2 shows the sub-partition type IntraSubPartitionsSplitType according to intra_subpartitions_mode_flag and intra_subpartitions_split_flag.

TABLE 2

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The ISP technology sets the split type IntraSubPartitionsSplitType as follows.

When intra_subpartitions_mode_flag is 0, IntraSubPartitionsSplitType is set to 0, and sub-block split is not performed, i.e., the ISP is not applied.

When intra_subpartitions_mode_flag is not 0, the ISP is applied. In this case, IntraSubPartitionsSplitType is set to a value of 1+intra_subpartitions_split_flag, and sub-block split is performed according to the split type. When IntraSubPartitionsSplitType=1, sub-block split is performed in a horizontal direction (ISP_HOR_SPLIT), and when IntraSubPartitionsSplitType=2, sub-block split is performed in a vertical direction (ISP_VER_SPLIT). In short, intra_subpartitions_split_flag may indicate a sub-block split direction.

For example, when an ISP mode in which sub-split is performed in the horizontal direction is applied to the current block, IntraSubPartitionsSplitType is 1, intra_subpartitions_mode_flag is 1, and intra_subpartitions_split_flag is 0.

In the following description, intra_subpartitions_mode_flag is referred to as a sub-block split application flag, intra_subpartitions_split_flag is referred to as a sub-block split direction flag, and IntraSubPartitionsSplitType is referred to as a sub-block split type. Further, information including the sub-block split application flag and the sub-block split direction flag is referred to as the ISP information.

As described above, when the size of the current block is too small in sub-splitting the current block in the horizontal or vertical direction, the coding efficiency of the split sub-blocks is rather degraded, or the sub-block is smaller than a minimum unit for transform, making the transform itself impossible. To prevent such a case from occurring, ISP application may be limited by referring to a size of a sub-block obtained after split. In other words, when the number of pixels of the split sub-block is 16 or more, sub-split may be applied. For example, when the size of the current block is 4×4, the ISP is not applied. A block with a size of 4×8 or 8×4 can be split into two sub-blocks having the same shape and size, which is called Half_Split. Blocks having other sizes may be split into four sub-blocks having the same shape and size, which is called Quarter_Split.

The video encoding apparatus sequentially encodes each sub-block. In this case, the respective sub-blocks share the same intra prediction information. In intra prediction for encoding each sub-block, the video encoding apparatus may use a restored pixel in a first encoded sub-block as a predicted pixel value of a subsequent sub-block to enhance compression efficiency.

Meanwhile, in the related art, since the ISP information is not transmitted to each of the YCbCr channels, the ISP technology is applied to only the luma channel and not to the chroma channel. In other words, the video encoding apparatus transmits intra_subpartitions_mode_flag and intra_subpartitions_split_flag only for the luma channel when ISP enabled flag sps_isp_enabled_flag on an SPS, which is a high level, is true. The video decoding apparatus first decodes the ISP enabled flag sps_isp_enabled_flag from a bitstream. When the ISP enabled flag is true, the video decoding apparatus may decode intra_subpartitions_mode_flag and intra_subpartitions_split_flag, which are the ISP information for the luma signals from the bitstream.

With the ISP technology, prediction is performed using rearranged reference samples in close positions, and a block is split so that many cases in which a tree structure for transform is omitted can occur. Therefore, when the intra prediction is applied, it is possible to enhance the coding efficiency by applying the ISP technology to all the YCbCr channels regardless of channel types. However, the ISP technology of the related art applied to the intra prediction has problem of inefficiency in the following aspects.

First, as described above, there is a problem that the ISP technology of the related art is not applied to the chroma channel. The compression efficiency or image quality improvement effect of the ISP may appear mainly in the luma channel depending on videos but may also appear mainly in the chroma signals. Meanwhile, for many images, there are many cases in which it is efficient to use the ISP in both the luma channel and the chroma channel. However, since the ISP technology of the related art is applied to only the luma channel, effects of the ISP technology on the chroma channel cannot be used even when effects of compression efficiency and/or image quality improvement through the application of the ISP exists in the chroma channel. Accordingly, the ISP technology of the related art needs to be extended so that a determination can be made as to whether or not to independently or dependently apply the ISP to each of the luma channel and the chroma channel, and the ISP can be enabled.

Next, since the ISP technology of the related art is designed to be applied to only the luma signals, there is a problem that it is impossible to apply this technology to the chroma channel as it is. For example, since the chroma channel has spatial resolution different from that of the luma signals according to the chroma format unlike the luma channel, effects of ISP may be different. Accordingly, an ISP technology to be applied to the chroma signals should be designed in consideration of the chroma format. Further, when a determination is made as to whether or not to apply the ISP to the chroma channel, the ISP technology should be designed to be enabled in consideration of the chroma format.

Meanwhile, the chroma format may be defined as shown in Table 3 as a value indicating relative resolution of the chroma channel with respect to the luma channel.

TABLE 3

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

Here, separate_colour_plane_flag is a flag for enabling a case in which three color components in a 4:4:4 chroma format are separately coded. In short, the flag indicates a case in which the color space is a color space of X, Y, Z channels or R, G, B channels rather than YCbCr. In other words, a case in which three channels of a video should be encoded/decoded independently of each other can be expressed. SubWidthC indicates a ratio between a width of the luma block and a width of the chroma block, and SubHeightC indicates a ratio between a height of the luma block and a height of the chroma block.

In the following description related to the present embodiment, ISP-related flags are mainly described, but the present embodiment is not necessarily limited thereto. In other words, the present embodiment can also be applied to all or some of the above-described information (all flags related to the ISP and all of pieces of information described above are referred to as encoding information for convenience) as an object to which the same operating principle as in the present embodiment can be applied.

Therefore, an object of the present disclosure is to improve a video compression rate or image quality by solving at least the above-described problems, and specific realization examples are described hereinafter.

II. Application of ISP to Chroma Block

According to the present disclosure, an ISP technology may be applied to the chroma channel in addition to the luma channel, as follows. First, it may be necessary to enable or disable the enabling of the ISP technology depending on applications. For example, when the ISP technology is advantageous in a part of the video, but the ISP technology is disadvantageous in the other part, the enabling of the ISP technology can be as a whole adjusted at a high level. To this end, a chroma ISP enabled flag sps_chroma_isp_enabled_flag, which separately indicates whether to allow the ISP for the chroma channel, may be additionally implemented on the SPS, in addition to the ISP enabled flag sps_isp_enabled_flag. According to a current technology, sps_isp_enabled_flag=0 indicates that the ISP technology cannot be used, and sps_isp_enabled_flag=1 indicates that the ISP technology can be used for the luma channel. Accordingly, according to the present disclosure, the chroma ISP enabled flag sps_chroma_isp_enabled_flag may be transmitted to indicate whether the ISP technology is applied to the chroma block.

Hereinafter, the present embodiment is described focusing on parsing of encoding information in the video decoding apparatus. Here, the video encoding apparatus is referred to, when necessary for convenience of description. Nevertheless, most of the embodiments described below can be equally or similarly applied to the video encoding apparatus. Meanwhile, the video encoding apparatus determines encoding information in terms of rate distortion optimization. Thereafter, the video encoding apparatus encodes the information to generate a bitstream and then signals the bitstream to the video decoding apparatus. Further, the video encoding apparatus may acquire encoding information from the high level and proceed with subsequent processes.

According to the present disclosure, a method of parsing whether an ISP technology is applied to the luma channel and the chroma channel using sps_isp_enabled_flag and sps_chroma_isp_enabled_flag is as follows. The video decoding apparatus may decode sps_isp_enabled_flag and sps_chroma_isp_enabled_flag from the bitstream at a high level such as SPS.

TABLE 4

| sps_isp_enabled_flag |
| if (sps_isp_enabled_flag) |
|    sps_chroma_isp_enabled_flag |

As an example, as shown in Table 4, the video decoding apparatus first parses sps_isp_enabled_flag. When sps_isp_enabled_flag=0, this means that the ISP technology cannot be applied and indicates that the ISP technology cannot be used for both the luma channel and the chroma channel. On the other hand, when the parsed sps_isp_enabled_flag=1, this indicates that the ISP technology can be applied to the luma channel, and the video decoding apparatus additionally parses sps_chroma_isp_enabled_flag. When sps_chroma_isp_enabled_flag=1, this indicates that the ISP technology can be used for the chroma channel, and when sps_chroma_isp_enabled_flag=0, this indicates that the ISP technology cannot be used for the chroma channel.

As described above, sps_isp_enabled_flag and sps_chroma_isp_enabled_flag may be implemented with information on an SPS that is a high level and then may be transmitted to the video decoding apparatus. Alternatively, _isp_enabled_flag and sps_chroma_isp_enabled_flag may be implemented with information on a PPS, which is another high level and then may be transmitted to the video decoding apparatus.

In some applications, it may be advantageous to indicate whether or not to allow the ISP for the chroma channel separately of whether or not to allow the ISP for the luma channel. As another example, as shown in Table 5, the video encoding apparatus may independently encode sps_isp_enabled_flag and sps_chroma_isp_enabled_flag.

TABLE 5 sps_isp_enabled_flag
sps_chroma_isp_enabled_flag

Compared to the method presented in Table 4, in a method presented in Table 5, sps_chroma_isp_enabled_flag is parsed regardless of a value of sps_isp_enabled_flag. In other words, the video decoding apparatus may parse sps_isp_enabled_flag and sps_chroma_isp_enabled_flag, to determine whether or not the ISP technology can be applied to each of the luma channel and the chroma channel.

Further, a high level syntax can be implemented on the SPS as shown in Table 6 in consideration of the chroma format.

TABLE 6 sps_isp_enabled_flag
  if (sps_isp_enabled_flag && chroma_format_idc !=0)
    sps_chroma_isp_enabled_flag According to Table 6, when a chroma_format_idc value is not 0, i.e., in chroma formats of 4:2:0, 4:2:2, and 4:4:4, the video encoding apparatus and the video decoding apparatus may enable the ISP technology.

<Example 1-1> Method of Signaling or Parsing the ISP Information

In Example 1-1, values of sps_isp_enabled_flag and sps_chroma_isp_enabled_flag are signaled on the bitstream by the video encoding apparatus or parsed from the bitstream by the video decoding apparatus according to one of the methods shown in Tables 4, 5, and 6. Thereafter, the ISP information for the chroma channel at a CU level may be parsed as follows.

First, treeType is a variable indicating whether a single tree or a dual tree is used and whether a channel is the luma channel (DUAL_TREE_LUMA) when the dual tree is used. When the treeType indicating CU split for the current channel of the current block is a single tree or a dual tree indicating the luma channel, and sps_isp_enabled_flag=1, intra_subpartitions_mode_luma_flag and intra_subpartitions_split_luma_flag, which are the luma ISP information, are signaled from the video encoding apparatus to the video decoding apparatus in order to apply the ISP technology to the luma channel. In other words, a condition for transmission of the luma ISP information can be expressed as Equation 1.

(treeType==SINGLE_TREE||treeTpe==DUAL_TREE_LUMA)
&& sps_isp_enabled_flag     [Equation 1]

Further, when treeType is the single tree or the dual tree indicating the chroma channel, the chroma format is not a monochrome format, and sps_chroma_isp_enabled_flag=1, intra_subpartitions_mode_chroma_flag and intra_subpartitions_split_chroma_flag, which are the chroma ISP information, are signaled from the video encoding apparatus to the video decoding apparatus in order to apply the ISP technology to the chroma channel. In other words, a condition for transmission of the chroma ISP information can be expressed as Equation 2.

(treeType==SINGLE_TREE||treeType==DUAL_TREE_CHROMA)
&& chroma_format_idc!=0 && sps_isp_enabled_chroma_flag     [Equation 2]

In the following description, intra_subpartitions_mode_luma_flag and intra_subpartitions_split_luma_flag, which are the luma ISP information, are referred to as a luma sub-block split application flag and a luma sub-block split direction flag, respectively. Further, intra_subpartitions_mode_chroma_flag and intra_subpartitions_split_chroma_flag, which are the chroma ISP information, are referred to as a chroma sub-block split application flag and a chroma sub-block split direction flag, respectively.

According to the Example 1-1 described above, the ISP technology can be applied to the chroma channel as well as the luma channel regardless of treeType. To this end, the video decoding apparatus may parse the luma ISP information for the luma channel from the bitstream, may parse the chroma ISP information for the chroma channel from the bitstream, and then may perform application to decoding of the current block.

<Example 1-2> Method of Sharing ISP Information

Meanwhile, in terms of coding efficiency improvement, it may be somewhat inefficient to transmit the ISP information for each luma and chroma signals (or for each channel of Y, Cb, and Cr). Hereinafter, a realization example for solving this problem is described.

As shown in Table 7, separate_chroma_isp_flag is set in the high level, so that an ISP application method can be efficiently signaled according to the tree structure when the ISP is applied to the chroma signals.

TABLE 7 if (sps_chroma_isp_enabled_flag)
  separate_chroma_isp_flag

Here, when separate_chroma_isp_flag=0, intra_subpartitions_mode_flag and intra_subpartitions_split_flag are not separately signaled or parsed for the chroma block, and, for example, the chroma block inherits and uses the luma ISP information of the luma block. This inheritance can be used in a single tree in which tree structures of the luma channel and the chroma channel are the same. However, such inheritance is possible even in the case of a dual tree. Alternatively, the chroma block may derive the chroma ISP information using various pieces of information. Inheritance of the luma ISP information and derivation of the chroma ISP information are described in detail below.

Further, when separate_chroma_isp_flag=1, the chroma channel does not refer to intra_subpartitions_mode_flag and intra_subpartitions_split_flag, which are the ISP information of the luma channel. In other words, the ISP information is signaled separately for the chroma channel, and the ISP technology may be applied to the chroma channel using values thereof.

Hereinafter, separate_chroma_isp_flag indicating whether to separate the chroma ISP information is referred to as a separate chroma ISP flag.

According to the method shown in Table 7, a value of separate_chroma_isp_flag is signaled on the bitstream by the video encoding apparatus or parsed from the bitstream by the video decoding apparatus. Thereafter, the ISP information for the chroma channel at the CU level may be parsed as follows.

First, when treeType is the single tree or the dual tree indicating the luma channel, and sps_isp_enabled_flag=1, intra_subpartitions_mode_luma_flag and intra_subpartitions_split_luma_flag that are the luma ISP information are signaled from the video encoding apparatus to the video decoding apparatus in order to apply the ISP technology to the luma channel. In other words, the condition for transmission of the luma ISP information can be expressed as Equation 1 described above.

Further, when treeType is the single tree or the dual tree indicating the chroma channel, the chroma format is not a monochrome format, and sps_chroma_isp_enabled_flag=1, and separate_chroma_isp_flag=1, intra_subpartitions_mode_chroma_flag and intra_subpartitions_split_chroma_flag, which are the chroma ISP information, are signaled from the video encoding apparatus to the video decoding apparatus in order to apply the ISP technology to the chroma channel. In other words, the condition for transmission of the chroma ISP information can be expressed as Equation 3.

(treeType==SINGLE_TREE||treeType==DUAL_TREE_CHROMA)
&& chroma_format_idc!=0 && sps_isp_enabled_chroma_flag && separate_chroma_isp_flag  [Equation 3]

<Example 2> Method of Inheriting ISP Information of Luma Channel and Applying ISP Information to Chroma Channel In general, since there is a considerable correlation between channels in the case of a video, the inefficiency of transmission of the ISP information to each YCbCr channel can be solved when decoding is performed by sharing or referring to ISP information of a block corresponding to another channel, which corresponds to the current channel. In other words, the ISP information is transmitted or parsed for one channel (or two channels) and used or referred to by the remaining channels, so that problems of the existing technology, such as compression rate degradation and image quality degradation, can be solved.

In order to share the ISP information between channels according to the present disclosure, one or a plurality of predetermined channels among the YCbCr channels may be selected as a representative channel. Accordingly, encoding information of the representative channel can be shared among or referred to by other channels at the time of encoding or decoding. In other words, the video decoding apparatus may decode the remaining channels by sharing the encoding information of the representative channel without separate signaling after receiving signaling of only the encoding information of the representative channel from the bitstream.

For example, when the luma channel having a highest correlation with brightness of the video is selected as a representative channel in a YCbCr color space, correlation exists between the luma channel and the chroma channel (Cb and/or Cr) of the video. Therefore, when the video is encoded/decoded using the ISP technology, as the ISP information of one (or two chroma channels) of Cb and Cr of the current block, the ISP information of a preset representative channel (for example, the luma channel or the Cb channel) may be shared instead of all ISP pieces of information being signaled for each channel.

Hereinafter, a specific method and an apparatus for transmitting and parsing the ISP information of the luma channel and deriving the ISP information of the chroma block using derivation schemes 1 to 4 when treeType is a dual tree are described.

Hereinafter, variable chType indicating the current channel is defined as follows. When the treeType indicating CU split for the current channel of the current block is the dual tree indicating the chroma channel, the value of chType is set to 1, and when the treeType is a single tree or the dual tree indicating the luma channel, the value of chType is set to 0. chType can be expressed as in Equation 4.

chType=treeType==DUAL_TREE_CHROMA?1:0  [Equation 4]

First, an embodiment in which the ISP information is parsed for the luma block and the ISP information of the luma block is shared instead of separate ISP information being parsed for the chroma block when the ISP technology is applied to the luma block and the chroma block is described.

This embodiment is implemented in two operations, as shown in Derivation scheme 1.

| [Derivation scheme 1] |
| --- |
| (Operation 1) |
| parse intra_subpartitions_mode_flag [0][x0][y0]    // bitstream parsing |
| parse intra_subpartitions_split_flag [0][x0][y0]    // bitstream parsing |
| (Operation 2) |
| intra_subpartitions_mode_flag [1][x0][y0] = intra_subpartitions_mode_flag [0][x0][y0] |
| intra_subpartitions_split_flag [1][x0][y0] = intra_subpartitions_split_flag [0][x0][y0] |

The video decoding apparatus parses intra_subpartitions_mode_flag and intra_subpartitions_split_flag, which are the ISP information for the luma block as in operation 1 of derivation scheme 1, and shares ISP information of the luma block (i.e., uses the same values) without separately parsing the ISP information for the chroma block as in operation 2 of derivation scheme 1.

Here, intra_subpartitions_mode_flag[chType][x0][y0] and intra_subpartitions_split_flag[chType][x0][y0] are the ISP information for a channel indicated by chType and a block corresponding to spatial coordinates (x0, y0). As described above, chType indicates a channel that is currently decoded. chType=0 indicates the luma channel, and chType=1 indicates the chroma channel. Accordingly, the ISP information of the current block of the currently decoded channel may be indicated as intra_subpartitions_mode_flag[chType][x0][y0] and intra_subpartitions_split_flag[chType][x0][y0].

Hereinafter, when there is no difficulty in understanding the operation, intra_subpartitions_mode_flag[chType][x0][y0] and intra_subpartitions_split_flag[chType][x0][y0] are referred to as intra_subpartitions_mode_flag and intra_subpartitions_split_flag, isp_mode_flag[chType][x0][y0] and isp_split_flag[chType][x0][y0], or isp_mode_flag and isp_split_flag, for convenience. Further, isp_mode_flag[0][x0][y0] and isp_split_flag[0][x0][y0], which are the ISP information of the luma channel, may be indicated as intra_subpartitions_mode_luma_flag and intra_subpartitions_split_luma_flag, respectively. Similarly, isp_mode_flag[1][x0][y0] and isp_split_flag[1][x0][y0], which are the ISP information of the chroma channel, may be indicated as intra_subpartitions_mode_chroma_flag and intra_subpartitions_split_chroma_flag, respectively.

Meanwhile, as another embodiment, the ISP information of the luma block corresponding to the current chroma block may be shared only under a specific condition, instead of being always shared. In this case, the following various modifications are possible depending on used conditions. In these embodiments, a scheme for first performing operation 1 of derivation scheme 1 and then modifying operation 2 according to various conditions may be used. Thus, it should be understood for modified embodiments that derivation scheme 2 and derivation scheme 3 describe only operation 2, but derivation scheme 2 and derivation scheme 3 describe additional operations after operation 1 shown in derivation scheme 1 is first performed.

First, in derivation scheme 2, when the current chroma block satisfies the condition of being the DM mode among the intra prediction modes, the video decoding apparatus shares the ISP information of the luma block corresponding to the chroma block.

[Derivation scheme 2]

```
(Operation 2)
if(CuPredMode [chType][x0][y0] ==        // intra prediction
    MODE_INTRA)                           mode,
    if(intra_chroma_pred_mode == 4) {    // DM mode
    intra_subpartitions_mode_flag [1][x0][y0] =
    intra_subpartitions_mode_flag [0][x0][y0]
    intra_subpartitions_split_flag [1][x0][y0] =
    intra_subpartitions_split_flag [0][x0][y0]
    }
```

Here, CuPredMode[chType][x0][y0] indicates the prediction mode of the current block corresponding to spatial coordinates (x0, y0). chType=0 indicates the luma channel, and chType=1 indicates the chroma channel. As described above, intra_chroma_pred_mode indicates the intra prediction mode of the chroma block, and intra_chroma_pred_mode=4 indicates that the intra prediction mode of the chroma block is the DM mode.

Next, in derivation scheme 3, the video coding/decoding apparatus shares the ISP information of the luma block corresponding to the chroma block by referring to conditions such as a size or shape of the current block.

[Derivation scheme 3]

```
(Operation 2)
if(Condition Check for Suggested Practice1) {
    perform one (or combination) of operation 2 derivation scheme 1 and
    operation 2 of derivation scheme 2
}
```

Here, the condition (i.e., Condition Check for Suggested Practice1) may be implemented as one of the four equations shown in Equation 5 depending on applications.

(cbWidth/SubWidthC!=cbHeight/SubHeightC), (cbWidth/SubWidthC==cbHeight/SubHeightC), (cbWidth/SubWidthC>=$N$*cbHeight/SubHeightC), (cbWidth/SubWidthC>=$N$*cbHeight/SubHeightC)  [Equation 5]

Here, 'cbWidth/SubWidthC' and 'cbHeight/SubHeightC' indicate a width and height of the current chroma block, respectively. Further, an inequality sign '>=' meaning that a left side is 'equal to or greater than' a right side may be replaced with '>' meaning that 'the left side is greater than the right side'. Further, N is a value indicating an aspect ratio of horizontal length and vertical length, is calculated as horizontal length/vertical length, and may be one of 2, 4, 8, 16, and 32.

Further, for the embodiments of derivation scheme 1 to derivation scheme 3, the video coding/decoding apparatus may share the ISP information of the luma block corresponding to the chroma block by referring to the condition of the size of the current block, as in derivation scheme 4.

[Derivation scheme 4]

```
(Operation 2)
if(Condition Check for Suggested Practice2) {
    perform one (or combination) of operation 2 of derivation scheme 1 to
    derivation scheme 3
}
```

Here, the condition (i.e., Condition Check for Suggested Practice 2) may be implemented as one of the nine equations shown in Equation 6 depending on applications.

((cbWidth/SubWidthC<$N$1)&&(cbHeight/SubHeightC<$N$2)), ((cbWidth/SubWidthC<$N$1)||(cbHeight/SubHeightC<$N$2)), (min(cbWidth/SubWidthC,cbHeight/SubHeightC)<$N$3), (max(cbWidth/SubWidthC,cbHeight/SubHeightC)<$N$4), ((cbWidth/SubWidthC*cbHeight/SubHeightC)<$N$5), ((cbWidth/SubwidthC+cbHeight/SubHeightC<$N$6), (cbWidth/SubWidthC==$N$7 && cbHeight/SubHeightC==$N$6), (cbWidth/SubWidthC==$N$7 && cbHeight/SubHeightC==$N$7), ((log(cbWidth/SubWidthC)+log(cbHeight/SubHeightC))<$N$8)  [Equation 6]

Here, the inequality symbol '<' meaning that the left side is 'smaller than' the right side may be replaced with '=<' that means 'the left side is smaller than or equal to the right side. Further, N1 to N7 indicating preset condition boundary values may be one of 2, 4, 8, 12, 16, 32, 64, and 128, and N8 may be one of 0, 1, 2, 3, 4, 5, and 6.

<Example 3> Method of Deriving and Using Chroma ISP Information

Meanwhile, it may be somewhat inefficient to transmit the ISP information for each of the luma signals and the chroma signals in terms of compression efficiency improvement. In Example 3, the video decoding apparatus may derive the ISP information of the chroma channel using various pieces of information and then decode a current chroma block using the derived ISP information.

Figure 7:
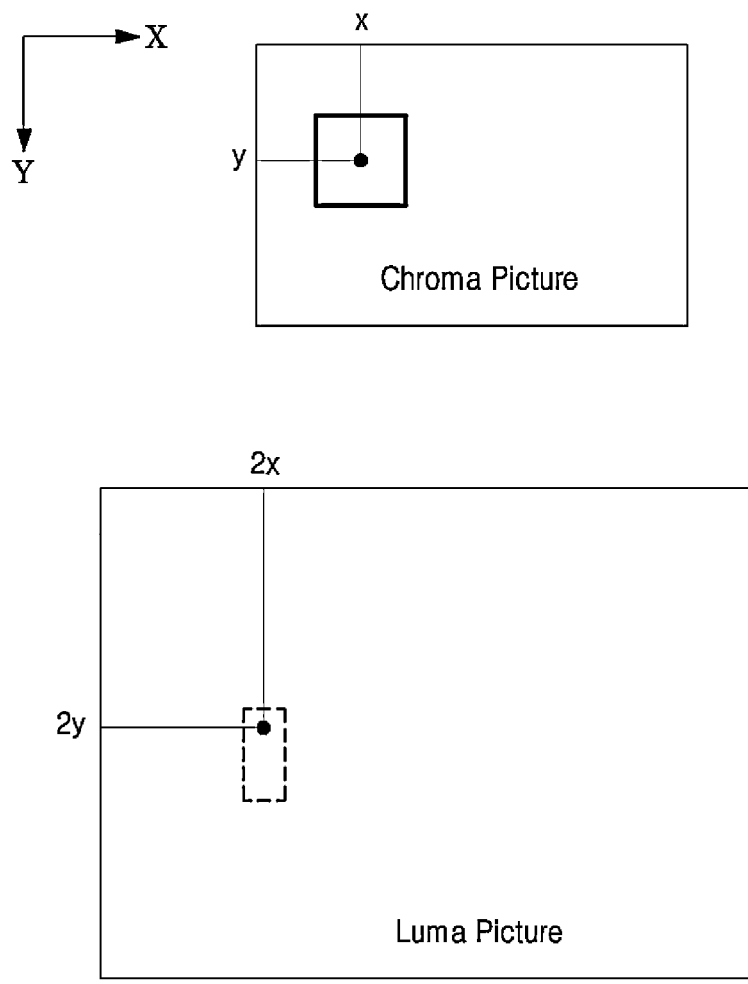
FIG. 7 is an illustrative diagram illustrating a chroma block and a luma block corresponding thereto according to an embodiment of the present disclosure.

FIG. 7 is an illustrative diagram illustrating the chroma block and the luma block corresponding thereto, according to an embodiment of the present disclosure.

Hereinafter, embodiments of deriving the ISP information of the chroma channel using various pieces of information are described. As the various pieces of information described above, a luma region (or luma block) corresponding to the current chroma block and neighboring information thereof, the current chroma block and neighboring information thereof, and the like may be used. As illustrated in FIG. 7, the luma block corresponding to the current chroma block may be defined as the luma block including a pixel corresponding to a center pixel of the current chroma block.

<Example 3-1> Derivation of ISP Information of Chroma Channel Using Information of Corresponding Luma Region As an embodiment, the ISP information of the chroma channel may be derived using information of a region of another channel corresponding to the current block of the current channel on the basis of correlation between channels in the video. Information of the luma region that can be used by the current chroma block includes the number of CUs, a CU split structure, a prediction mode distribution, and the like, and the ISP information of the chroma channel may be derived using one or more of such pieces of information.

First, a method of deriving the ISP information of the chroma channel with reference to the CU split structure is as follows.

Figure 8A:
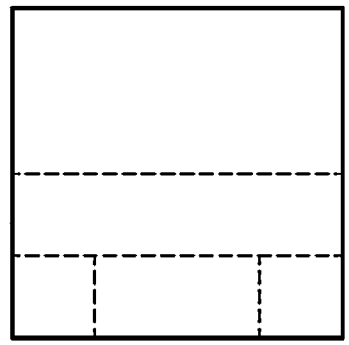
FIGS. 8A, 8B, and 8C are illustrative diagrams illustrating a split structure of the luma block.
Figure 8B:
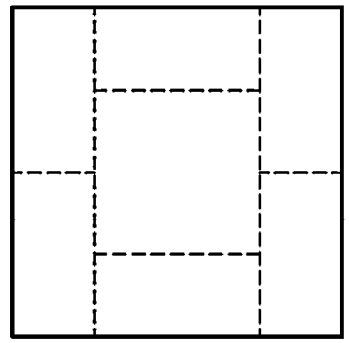

When the current chroma block is half split or quad split horizontally or vertically and the numbers of luma blocks corresponding to the respective regions are different, the ISP technology may be applied in the split direction. In this case, a determination that the numbers are different may depend on a difference in the number of blocks. For example, when the chroma block is horizontally half split as in the example of FIG. 8A, the numbers of luma blocks corresponding to upper and lower regions are different as 1 and 4, respectively. In this case, the ISP technology is applied, and thus intra_subpartitions_mode_flag is derived as 1 and intra_subpartitions_split_flag is derived as 0 (horizontal split). When the split is performed in the horizontal or vertical direction as in the example of FIG. 8B and the numbers of luma blocks corresponding to the respective regions are the same, ISP is not applied and accordingly, intra_subpartitions_mode_flag is derived as 0 (no split).

Next, a method of deriving the ISP information of the chroma channel by referring to a split structure of a corresponding luma region is as follows.

Figure 8C:
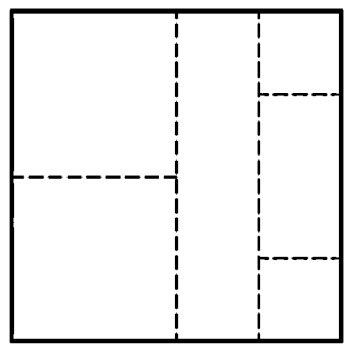

When the sub-split structure under the assumption of sub-split of the current chroma block is similar to the split structure of the corresponding luma region, the ISP technology may be applied to the chroma block. As in the example of FIG. 8C, when the split structure of the corresponding luma region is similar to a case in which the chroma block is vertically sub-split, the ISP technology is applied to the current chroma block, and the chroma block is vertically split. Therefore, intra_subpartitions_mode_flag is derived as 1, and intra_subpartitions_split_flag is derived as 1 (vertical split).

Figure 9A:
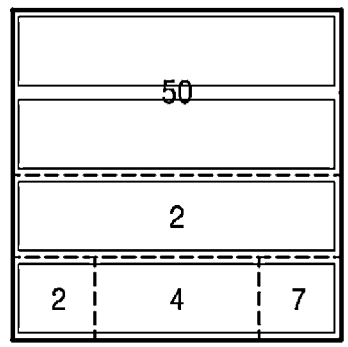
FIGS. 9A and 9B are illustrative diagrams illustrating a coding unit (CU) split structure referred to for derivation of ISP information of the chroma channel.
Figure 9B:
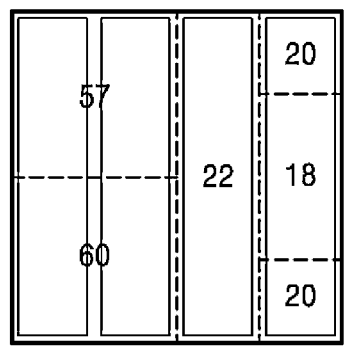

FIGS. 9A and 9B are illustrative diagrams illustrating the CU split structure referred to for derivation of the ISP information of the chroma channel.

Next, a method of deriving the ISP information of the chroma channel by referring to a prediction mode distribution of the corresponding luma region is as follows.

When a difference between a maximum value and a minimum value of prediction modes of luma blocks corresponding to sub-blocks under the assumption of sub-split of the current chroma block is N or less, this is expressed as a uniform prediction mode distribution. In this case, N may be set to 0, 1, 2, . . . . For example, prediction mode values of the luma block corresponding to the lowermost sub-block region under the assumption that horizontal sub-partition is performed as in the example of FIG. 9A are 2, 4, and 7. Therefore, the difference between the maximum value and the minimum value of the prediction mode is 5. When N is set to 3, a determination is made that the prediction mode distribution is not uniform and the ISP technology is not applied. On the other hand, differences between the maximum value and the minimum value of the prediction mode values of the luma block corresponding to the respective sub-blocks under assumption that vertical sub-partition is performed as illustrated in FIG. 9B are 3, 3, 0, and 2 from the left, respectively. Therefore, when N is set to 3, a determination is made that the prediction mode distribution is uniform, and the ISP mode can be applied in the vertical direction.

<Example 3-2> Deriving the ISP Information of the Chroma Channel Using Luma Region Information Around Corresponding Luma Region As another embodiment, the ISP information of the chroma channel may be derived using information of a luma region around the corresponding luma region in addition to the luma region.

When the number of luma blocks using the ISP among the luma blocks adjacent to the luma region corresponding to the current chroma block is equal to or greater than a preset number, the ISP information of the chroma channel may be derived.

Further, the ISP information of the chroma channel may be derived by using information of the corresponding luma region and information of the luma region around the corresponding luma region together.

<Example 3-3> Derivation of ISP Information of Chroma Channel Using Neighboring Chroma Information As another embodiment, the ISP information of the chroma channel may be derived using information of neighboring blocks with reference to the current chroma block, on the basis of a correlation between a pixel and a neighboring pixel in the video.

Figure 10A:
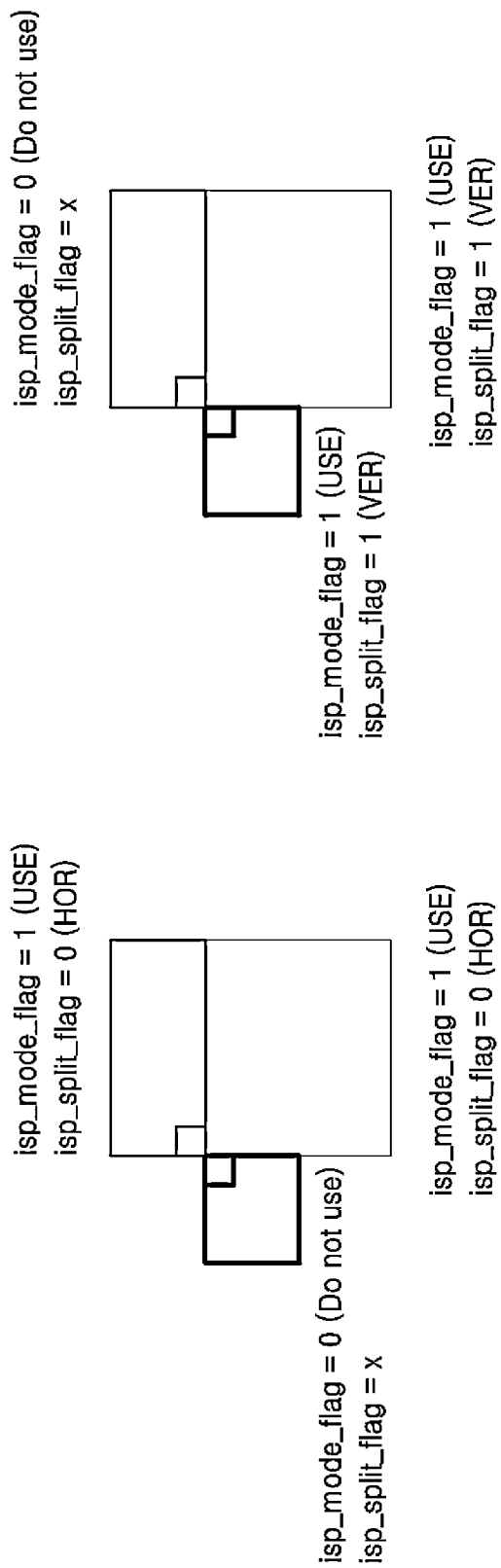
FIGS. 10A, 10B, and 10C are diagrams illustrating derivation of intra sub-partitions (ISP) information of the chroma channel based on information of neighboring blocks according to an embodiment of the present disclosure.
Figure 10B:
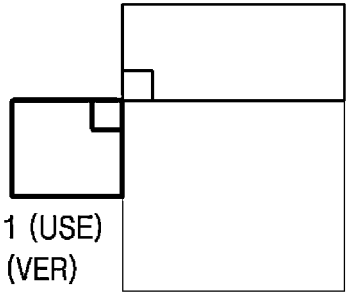
Figure 10C:
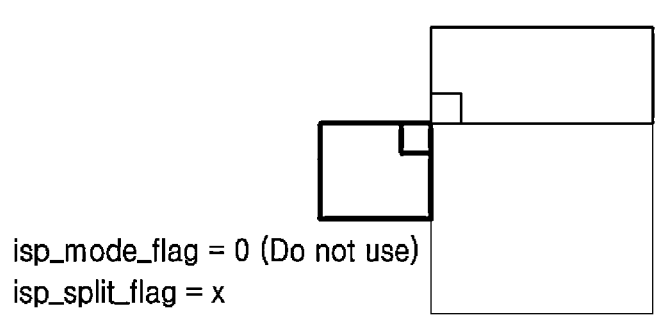

FIGS. 10A, 10B, and 10C are diagrams illustrating derivation of the ISP information of the chroma channel based on the information of neighboring blocks according to an embodiment of the present disclosure.

In the examples of FIGS. 10A, 10B, and 10C, a block to which a top sample belongs and a block to which a left sample belongs with reference to a top left sample of the current chroma block are used to derive the ISP information of the chroma channel. As in the example of FIG. 10A, when only one of the two neighboring blocks uses the ISP, the ISP information of the block using the ISP may be used as the ISP information of the chroma channel. As in the example of FIG. 10B, when both the neighboring blocks use the ISP, the ISP information of the block having a larger area may be used as the ISP information of the chroma channel. As in the example of FIG. 10C, when both the neighboring blocks do not use the ISP, intra_subpartitions_mode_flag is determined to be 0 (no split).

<Example 3-4> Derivation of the ISP Information of the Chroma Channel Using Information of Current Chroma Block As another embodiment, the ISP information of the chroma channel may be derived using information included in the current chroma block. In this case, available information includes a prediction mode, a block size, a block aspect ratio, and the like of the current block. For example, when the prediction mode of the current chroma block is DM, the ISP information of the corresponding luma block may be used as the ISP information of the chroma channel.

Alternatively, when the current chroma prediction mode is equal to or greater than the diagonal directional prediction mode (No. 34) and the block aspect ratio is greater than 1, intra_subpartitions_mode_flag may be determined to be 1, and intra_subpartitions_split_flag may be determined to be 0 (horizontal split). Alternatively, when the current chroma prediction mode is smaller than number 34 and the block aspect ratio is smaller than 1, intra_subpartitions_mode_flag may be determined to be 1 and intra_subpartitions_split_flag may be determined to be 1 (vertical split).

<Example 4> Method for Signaling/Inheriting/Deriving Part of ISP Information of Chroma Channel As another embodiment, when there are a plurality of ISP-related flags according to the method of the above-described embodiments, a determination may be made as to whether to selectively signal, inherit, or derive information for each flag. First, a determination is made as to whether all ISP pieces of information is signaled, inherited, or derived using chroma_ISP_info_decision_flag. Alternatively, each ISP pieces of information is divided by chroma_ISP_info_idx and then chroma_ISP_info_decision_flag is signaled for each flag so that a determination can be made as to whether the flag can be signaled, inherited, or derived. In this case, a substantial signal, inheritance, and derivation method for each flag may be the same as in the above-described embodiment.

<Example 5> Method of Determining Various Split Types of ISP

Meanwhile, for the current luma channel, the split type of the ISP technology is adaptively determined to be one of half split and quad split depending on the size of the block. Therefore, in the present embodiment, for the chroma channel, the split type of the ISP technology is may also be selected, as in a luma channel method. For example, in order to reduce complexity, only half split may be performed for the chroma channel. Alternatively, an additional flag cu_ISP_quad_flag indicating whether to perform half split or quad split at the time of encoding may be defined and then may be signaled for each block. In this case, the ISP is applied in quad split when cu_ISP_quad_flag is 1, and the ISP is applied in half split when cu_ISP_quad_flag is 0, so that the block itself can determine the number of splits. Hereinafter, cu_ISP_quad_flag, which is a flag indicating quad split of the chroma block, is referred to as a sub-block quad split flag.

Meanwhile, the resolution of the chroma channel may be different from that of the luma channel according to the chroma format of the chroma channel, unlike the luma channel. As shown in Table 3, chroma_format_idc is information indicating a configuration of the chroma channel. The ISP information of the chroma channel may be determined by referring to such a chroma format, i.e., chroma_format_idc value. For example, in the case of 4:2:0 and 4:2:2 formats, the ISP is applied to half split, and in the case of the 4:4:4 format, one of half split and quad split may be selected adaptively according to a block size, as in the ISP of the luma channel.

<Example 6> Method of Inheriting or Deriving Chroma Transform

Meanwhile, when the ISP is applied to the luma block, a transform method may be implicitly determined according to the size of the sub-block, and an optimized transform can be used with reduced coding complexity. In the present realization example, a method of implicitly determining a type of transform in advance and using various transform combinations without an additional signal when the ISP is applied to the chroma block is described.

<Example 6-1> Method of Implicitly Deriving Transform

Figure 11A:
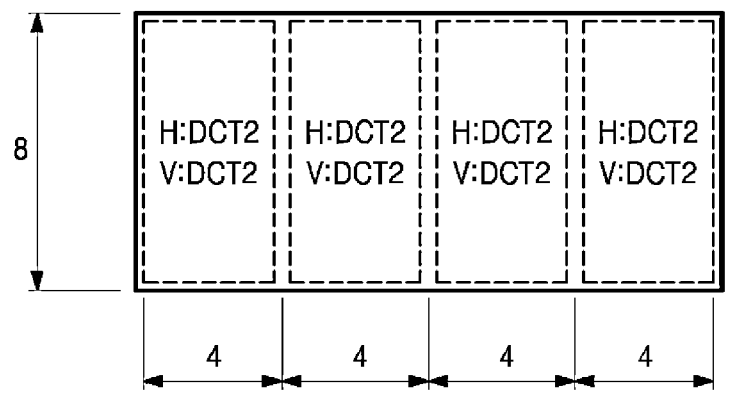
FIGS. 11A and 11B are illustrative diagrams illustrating a determination of implicit transform types for sub-blocks according to an embodiment of the present disclosure.
Figure 11A:
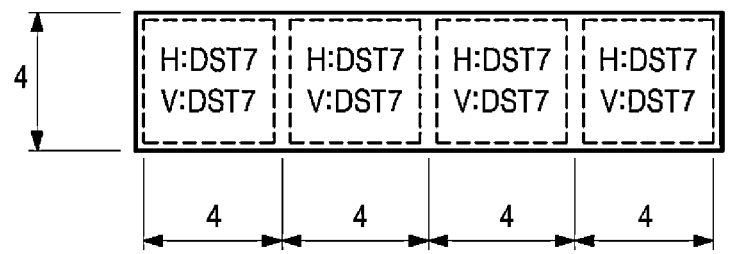
Figure 11A:
Figure 11A:
Figure 11B:
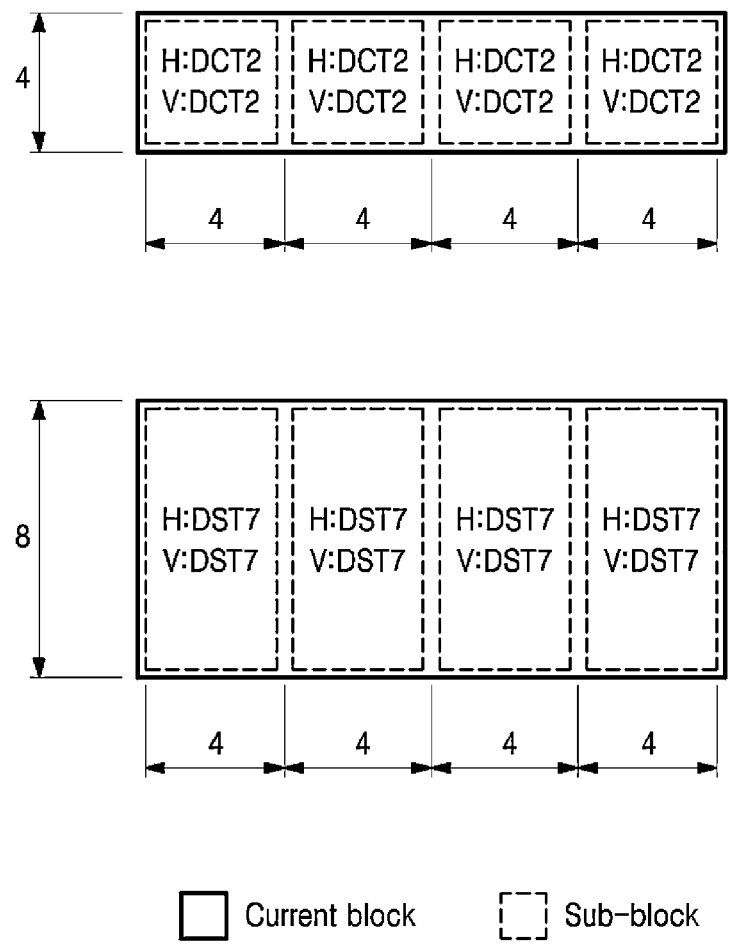

As an embodiment, a method of implicitly determining the type of transform for sub-blocks generated by applying the ISP technology to the chroma block is as follows. For example, when both the horizontal length and the vertical length are considered and a width×height of the sub-block is greater than a threshold k (where k is a natural number), DCT2 is allocated to a horizontal transform and DCT2 is allocated to a vertical transform. Further, an aspect ratio may be considered. When the sub-block is a square, DCT2 is allocated to horizontal transform and DCT2 is allocated to vertical transform. Further, a length may also be considered. DCT2 is allocated when the horizontal or vertical length is greater than 8, and DST7 is allocated when the length is equal to or smaller than 8. FIG. 11A illustrates an example in which DCT2 and DCT2 are allocated when the size of the sub-block is greater than 16, and DST7 and DST7 are allocated when the size of the sub-block is equal to or smaller than 16. FIG. 11B illustrates an example in which DCT2 and DCT2 are allocated when the aspect ratio of the sub-block is 1, and DST7 and DST7 are allocated when the aspect ratio is not 1.

<Example 6-2> Method of Implicitly Inheriting Transform

As another embodiment, the chroma channel may inherit transform types of sub-blocks of the luma channel. For example, implicit_isp_separate_transform_flag is first signaled so that the chroma channel can implicitly inherit the transform types of sub-blocks of the luma channel. In other words, when implicit_isp_separate_transform_flag is 1, the chroma channel may inherit and use the transform types of sub-blocks of the corresponding luma block without signaling the type of transform to be applied to the chroma block to which the ISP has been applied. On the other hand, when implicit_isp_separate_transform_flag is 0, an independent transform type is determined and transmitted for the chroma block so that the type of transform applied to the sub-block to which the ISP has been applied may be signaled. Hereinafter, implicit_isp_separate_transform_flag, which is a flag indicating implicit transform type inheritance of sub-blocks of the chroma block, is referred to as a sub-block transform inheritance flag.

Hereinafter, a video encoding method and a video decoding method based on Tables 4 to 6 are described using illustrations of FIGS. 12 and 13.

Figure 12:
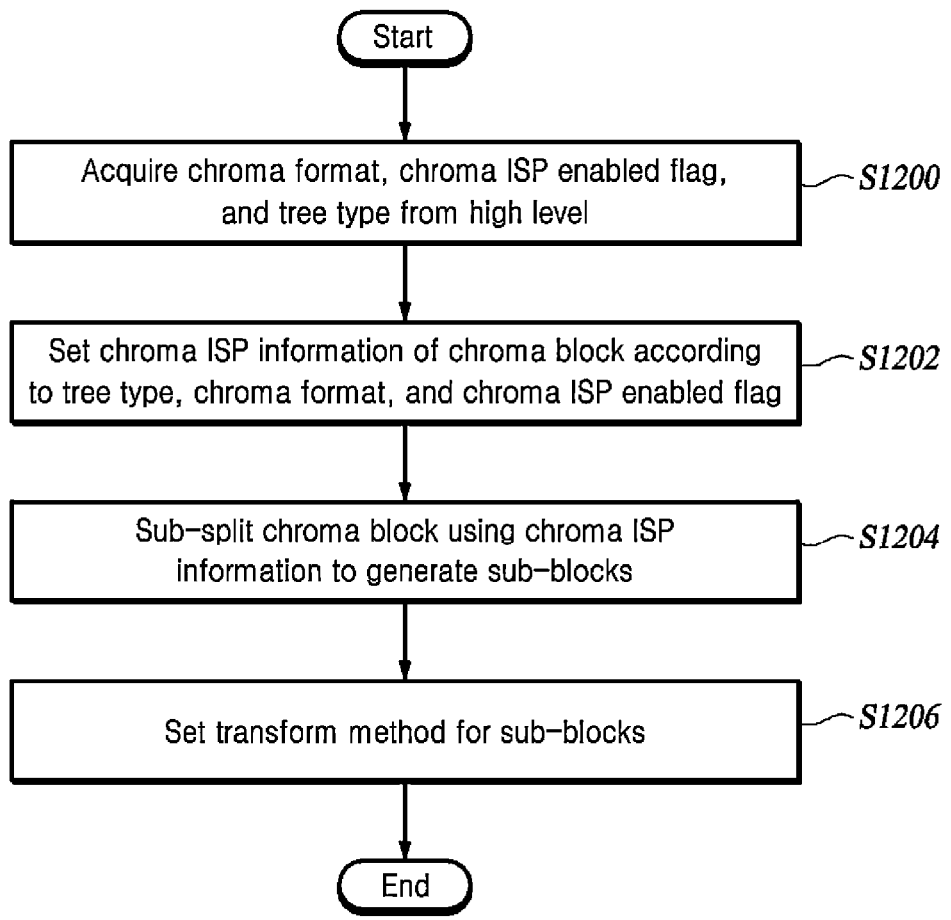
FIG. 12 is a flowchart illustrating a method of applying an ISP to a chroma block of the current block, performed by a video encoding apparatus, according to an embodiment of the present disclosure.

FIG. 12 is a flowchart illustrating a method of applying an ISP to the chroma block of the current block, performed by the video encoding apparatus, according to an embodiment of the present disclosure.

The video encoding apparatus acquires the chroma format, the chroma ISP enabled flag, and the tree type from the high level (S1200).

Here, the chroma format indicates the relative resolution of the chroma channel with respect to the luma channel of the current block. The chroma ISP enabled flag is a flag indicating whether an ISP can be used for the chroma block. The tree type indicates a tree split structure for encoding of the current block.

The video encoding apparatus sets the chroma ISP information of the chroma block according to the tree type, the chroma format, and the chroma ISP enabled flag (S1202). Here, the chroma ISP information includes a chroma sub-block split application flag and a chroma sub-block split direction flag. The chroma sub-block split application flag is a flag indicating whether or not the chroma block is sub-split, and the chroma sub-block split direction flag is a flag indicating a sub-split direction of the chroma block.

When the tree type is the single tree or the dual tree indicating the chroma channel of the current block, the chroma format is not monochrome, and the chroma ISP enabled flag is true, the video encoding apparatus sets the chroma ISP information.

The video encoding apparatus sub-splits the chroma block using the chroma ISP information to generate sub-blocks (S1204).

The video encoding apparatus acquires cu_ISP_quad_flag, which is a sub-block quad split flag indicating quad split of the chroma block from the high level. Thereafter, the video encoding apparatus generates sub-blocks in which the chroma block is half split or quad split according to a value of the sub-block quad split flag.

Alternatively, the video encoding apparatus may generate sub-blocks in which the chroma block is half split or quad-split according to the chroma format.

Alternatively, the video encoding apparatus may generate sub-blocks in which the chroma block is half split or quad split according to a size of the chroma block. For example, in order to reduce complexity, sub-blocks in which the chroma block is half split may always be generated.

The video encoding apparatus sets a transform method for sub-blocks (S1206).

The video encoding apparatus sets a preset transform method as a transform method for sub-blocks according to the size or shape of the sub-blocks.

Alternatively, the video encoding apparatus acquires the implicit_isp_separate_transform_flag, which is a sub-block transform inheritance flag indicating implicit transform type inheritance of sub-blocks from the high level. Then, when the sub-block transform inheritance flag is true, the video encoding apparatus may set a transform method for the luma block corresponding to the chroma block as the transform method for sub-blocks.

Figure 13:
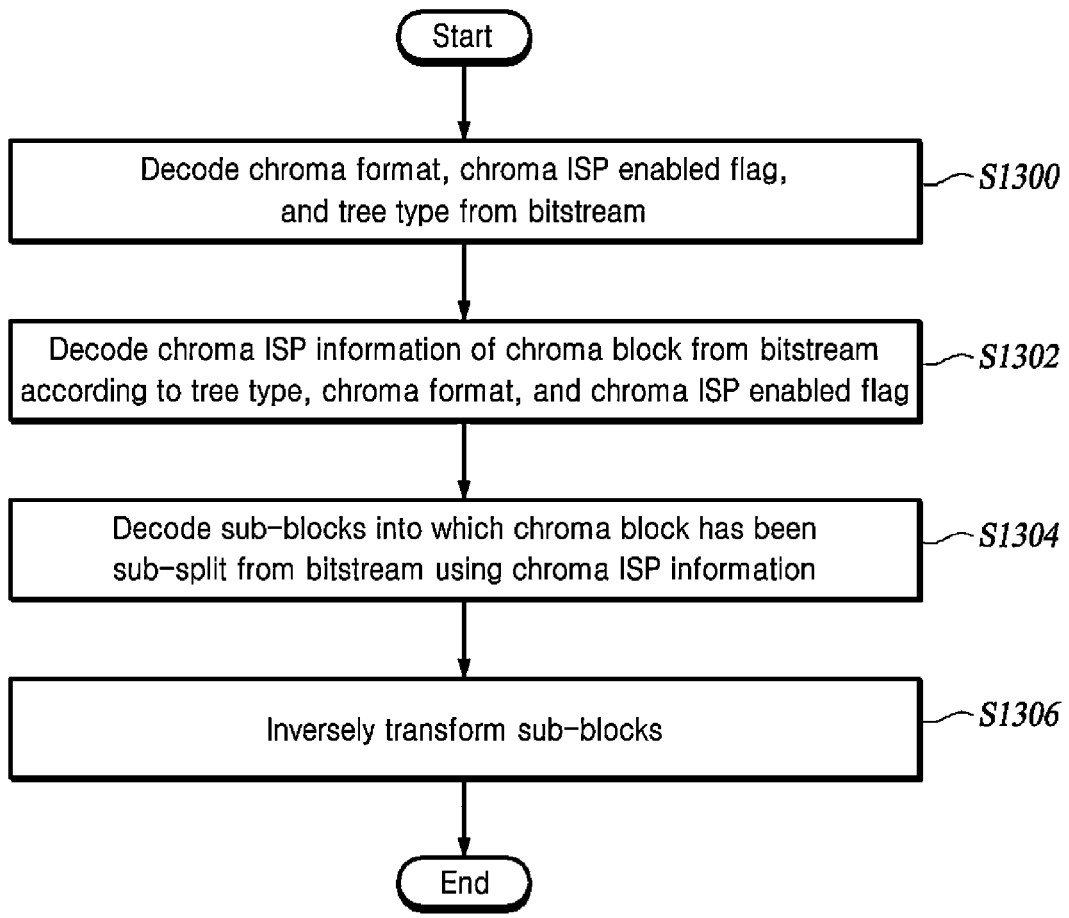
FIG. 13 is a flowchart illustrating a method of applying an ISP to the chroma block of the current block, performed by a video decoding apparatus, according to an embodiment of the present disclosure.

FIG. 13 is a flowchart illustrating a method of applying an ISP to the chroma block of the current block, performed by a video decoding apparatus, according to an embodiment of the present disclosure.

The video decoding apparatus decodes the chroma format, the chroma ISP enabled flag, and the tree type from the bitstream (S1300).

The video decoding apparatus decodes the chroma ISP information of the chroma block from the bitstream according to the tree type, the chroma format, and the chroma ISP enabled flag (S1302).

When the tree type is the single tree or the dual tree indicating the chroma channel of the current block, the chroma format is not a monochrome format, and the chroma ISP enabled flag is true, the video decoding apparatus decodes the chroma ISP information.

The video decoding apparatus decodes sub-blocks into which the chroma block has been sub-split from the bitstream using the chroma ISP information (S1304).

The video decoding apparatus decodes cu_ISP_quad_flag, which is a sub-block quad split flag indicating quad split of the chroma block from the bitstream. Thereafter, the video encoding apparatus decodes sub-blocks from which the chroma block is half split or quad split according to the value of the sub-block quad split flag.

Alternatively, the video decoding apparatus may decode sub-blocks into which the chroma block has been half split or quad split according to the chroma format.

Alternatively, the video decoding apparatus may decode sub-blocks into which the chroma block has been half split or quad split according to the size of the chroma block. For example, in order to reduce complexity, sub-blocks into which the chroma block is half split may always be decoded.

The video decoding apparatus inversely transforms the sub-blocks (S1306).

The video decoding apparatus inversely transforms the sub-blocks using a preset transform method according to the size or shape of the sub-blocks.

Alternatively, the video decoding apparatus decodes implicit_isp_separate_transform_flag that is a sub-block transform inheritance flag indicating implicit transform type inheritance of sub-blocks from the bitstream. Thereafter, when the sub-block transform inheritance flag is true, the video decoding apparatus may inversely transform the sub-blocks using the transform method for the luma block corresponding to the chroma block.

Hereinafter, a video encoding method and a video decoding method based on Table 7 are described using the illustrations of FIGS. 14 and 15.

Figure 14:
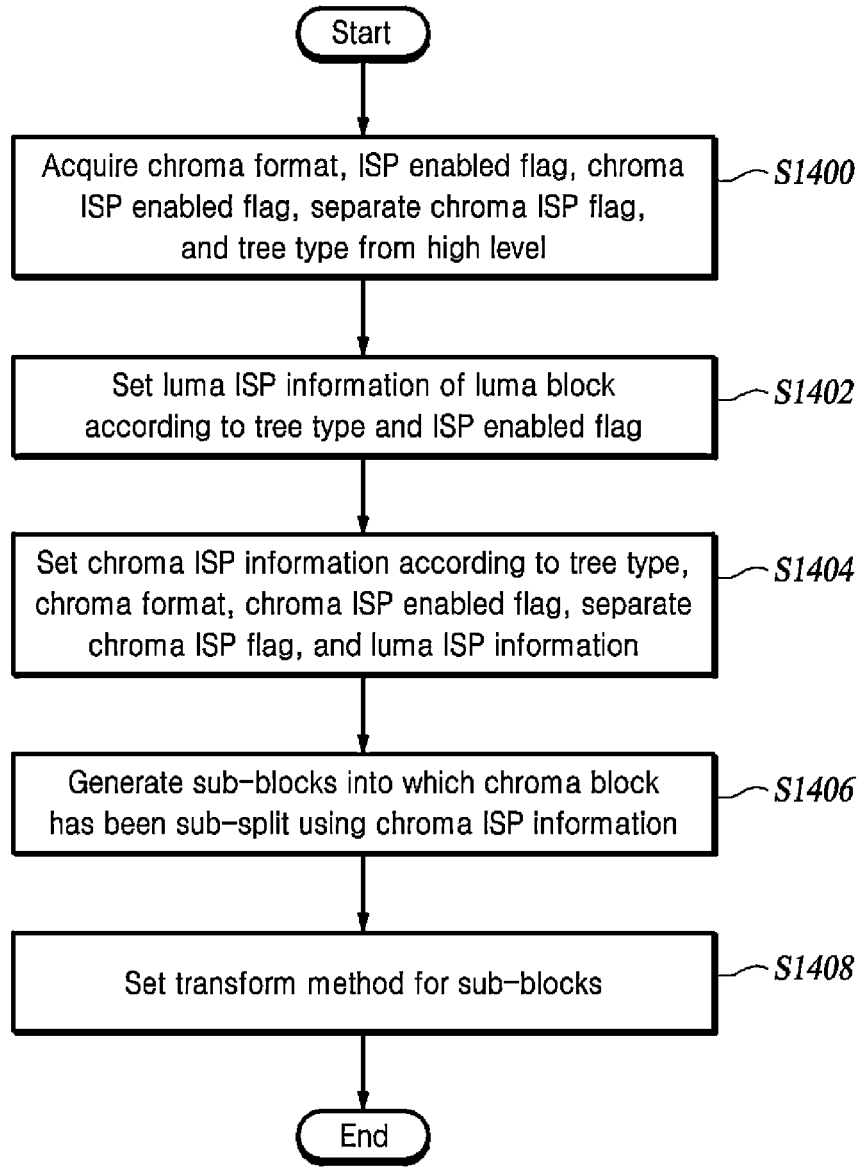
FIG. 14 is a flowchart illustrating a method of applying an ISP to the chroma block of the current block, performed by the video encoding apparatus, according to another embodiment of the present disclosure.

FIG. 14 is a flowchart illustrating a method of applying an ISP to the chroma block of the current block, performed by the video encoding apparatus, according to another embodiment of the present disclosure.

The video encoding apparatus acquires the chroma format, the ISP enabled flag, the chroma ISP enabled flag, the separate chroma ISP flag, and the tree type from the high level (S1400).

Here, the ISP enabled flag is a flag indicating whether or not the ISP is available for the luma block of the current block. The split chroma ISP flag is a flag indicating whether to split the chroma ISP information of the chroma block.

The video encoding apparatus sets luma ISP information of the luma block according to the tree type and the ISP enabled flag (S1402). Here, the luma ISP information includes a luma sub-block split application flag and a luma sub-block split direction flag. The luma sub-block split application flag is a flag indicating whether the luma block is sub-split, and the luma sub-block split direction flag is a flag indicating the sub-split direction of the luma block.

When the tree type is the single tree or the dual tree indicating the luma channel of the current block, and the ISP enabled flag is true, the video encoding apparatus sets the luma ISP information.

The video encoding apparatus sets the chroma ISP information according to the tree type, chroma format, chroma ISP enabled flag, separate chroma ISP flag, and luma ISP information (S1404).

When the tree type is the single tree or the dual tree indicating the chroma channel of the current block, the chroma format is not the monochrome format, and the chroma ISP enabled flag and the separate chroma ISP flag are true, the video encoding apparatus sets the chroma ISP information.

The video encoding apparatus may use the luma ISP information as the chroma ISP information when the chroma ISP enabled flag is true but the separate chroma ISP flag is false.

Further, the video encoding apparatus may use the luma ISP information as the chroma ISP information when the chroma ISP enabled flag is true, the separate chroma ISP flag is false, and the intra prediction mode of the current block is included in preset prediction modes.

Further, the video encoding apparatus may use the luma ISP information as the chroma ISP information when the chroma ISP enabled flag is true, the separate chroma ISP flag is false, and the size or shape of the chroma block satisfies one of preset conditions.

The video encoding apparatus may derive the chroma ISP information by referring to the split structure of the luma region corresponding to the chroma block, the prediction mode distribution, or information of the neighboring luma region when the chroma ISP enabled flag is true but the separate chroma ISP flag is false.

Further, the video encoding apparatus may derive the chroma ISP information by using information of the chroma block or information of neighboring blocks of the chroma block when the chroma ISP enabled flag is true but the separate chroma ISP flag is false.

The video encoding apparatus generates sub-blocks into which the chroma block has been sub-split using the chroma ISP information (S1406).

The video encoding apparatus sets a transform method for the sub-blocks (S1408).

Figure 15:
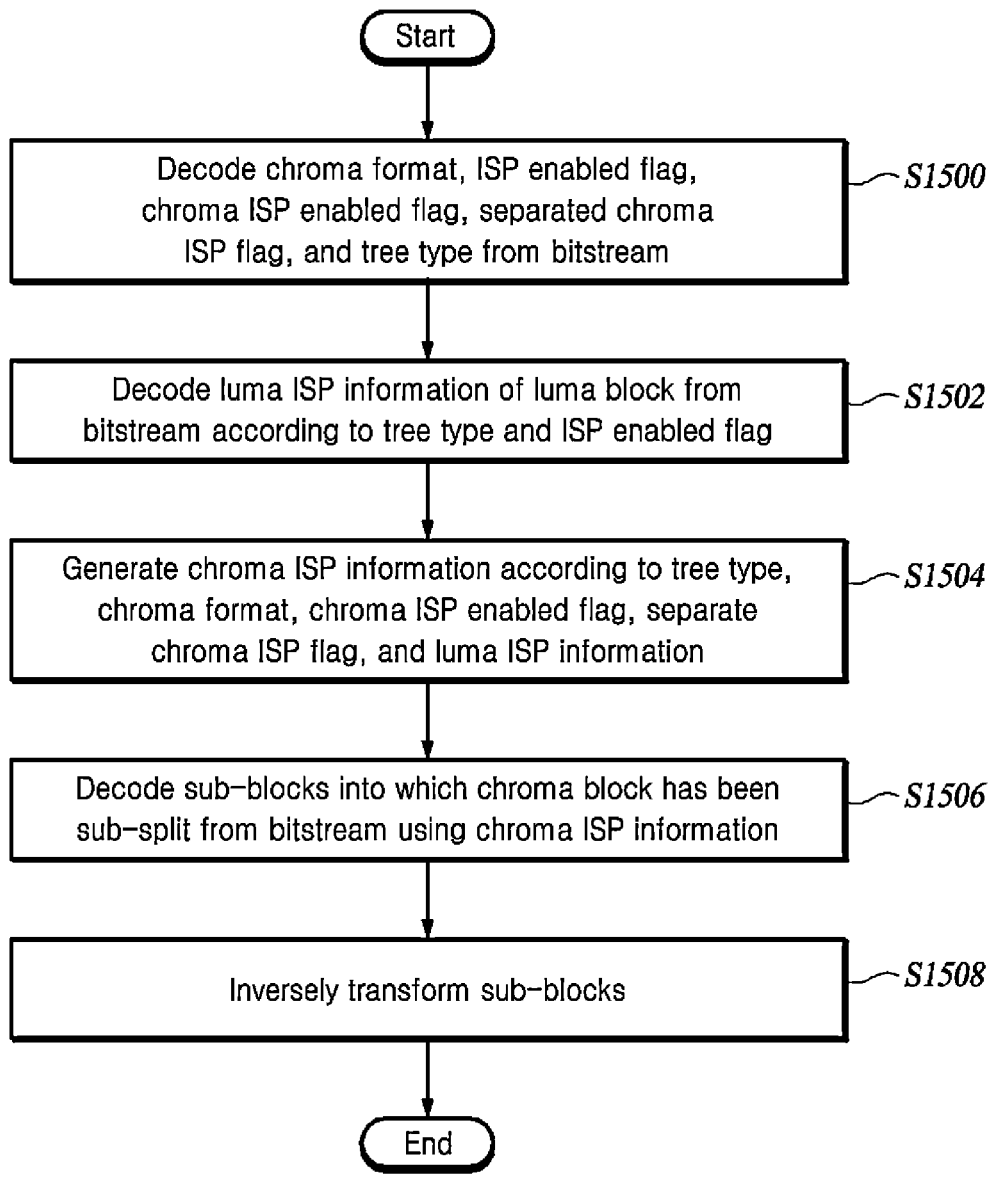
FIG. 15 is a flowchart illustrating a method of applying an ISP to the chroma block of the current block, performed by the video decoding apparatus, according to another embodiment of the present disclosure.

FIG. 15 is a flowchart illustrating a method of applying an ISP to the chroma block of the current block, performed by the video decoding apparatus, according to another embodiment of the present disclosure.

The video decoding apparatus decodes the chroma format, the ISP enabled flag, the chroma ISP enabled flag, the separated chroma ISP flag, and the tree type from the bitstream (S1500).

The video decoding apparatus decodes the luma ISP information of the luma block from the bitstream according to the tree type and the ISP enabled flag (S1502).

When the tree type is the single tree or the dual tree indicating the luma channel of the current block, and the ISP enabled flag is true, the video decoding apparatus decodes the luma ISP information.

The video decoding apparatus generates the chroma ISP information according to the tree type, chroma format, chroma ISP enabled flag, separate chroma ISP flag, and luma ISP information (S1504).

When the tree type is the single tree or the dual tree indicating the chroma channel of the current block, the chroma format is not the monochrome format, and the chroma ISP enabled flag and the separate chroma ISP flag are true, the video decoding apparatus decodes the chroma ISP information from the bitstream.

The video decoding apparatus may use the luma ISP information as the chroma ISP information when the chroma ISP enabled flag is true but the separate chroma ISP flag is false.

Further, the video decoding apparatus may use the luma ISP information as the chroma ISP information when the chroma ISP enabled flag is true, the separate chroma ISP flag is false, and the intra prediction mode of the current block is included in preset prediction modes.

Further, the video decoding apparatus may use the luma ISP information as the chroma ISP information when the chroma ISP enabled flag is true, the separate chroma ISP flag is false, and the size or shape of the chroma block satisfies one of preset conditions.

The video decoding apparatus may derive the chroma ISP information by referring to the split structure of the luma region corresponding to the chroma block, the prediction mode distribution, or information of the neighboring luma region when the chroma ISP enabled flag is true but the separate chroma ISP flag is false.

Further, the video decoding apparatus may derive the chroma ISP information by using information of the chroma block or information of neighboring blocks of the chroma block when the chroma ISP enabled flag is true but the separate chroma ISP flag is false.

The video decoding apparatus decodes sub-blocks into which the chroma block has been sub-split from the bitstream using the chroma ISP information (S1506).

The video decoding apparatus inversely transforms the sub-blocks (S1508).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMERALS

122: Intra predictor
140: Transformer
510: Entropy decoder
530: Inverse transformer
542: Intra predictor

What is claimed is:

1. A method of applying intra sub-partitions (ISP) to a chroma block of a current block, performed by a video decoding apparatus, the method comprising:
decoding a chroma format, a chroma ISP enabled flag, and a tree type from a bitstream, wherein the chroma format indicates relative resolution of a chroma channel with respect to a luma channel of the current block, the chroma ISP enabled flag is a flag indicating whether or not the ISP is available for the chroma block, and the tree type indicates a tree split structure for decoding of the current block;
decoding chroma ISP information of the chroma block from the bitstream according to the tree type, the chroma format, and the chroma ISP enabled flag, wherein the chroma ISP information includes a chroma sub-block split application flag and a chroma sub-block split direction flag;
decoding sub-blocks into which the chroma block has been sub-split from the bitstream using the chroma ISP information; and
inversely transforming the sub-blocks.

2. The method of claim 1,
wherein the chroma sub-block split application flag is a flag indicating whether or not the chroma block is sub-split, and
wherein the chroma sub-block split direction flag is a flag indicating a sub-split direction of the chroma block.

3. The method of claim 1, wherein decoding the chroma ISP information includes:
decoding the chroma ISP information when the tree type is a single tree or a dual tree indicating the chroma channel of the current block, the chroma format is not a monochrome format, and the chroma ISP enabled flag is true.

4. The method of claim 1, further comprising:
decoding a sub-block quad split flag indicating quad split of the chroma block from the bitstream,
wherein decoding the sub-blocks includes:
decoding sub-blocks into which the chroma block is half split or quad-split according to a value of the sub-block quad split flag.

5. The method of claim 1, wherein decoding the sub-blocks includes decoding sub-blocks into which the chroma block is half split or quad split according to the chroma format.

6. The method of claim 1, wherein inversely transforming the sub-blocks includes:
inversely transforming using a preset transform method according to a size or shape of the sub-blocks.

7. The method of claim 1, further comprising:
decoding a sub-block transform inheritance flag indicating implicit transform type inheritance of the sub-blocks from the bitstream,
wherein inversely transforming the sub-blocks includes:
inversely transforming the sub-blocks using an inverse transform method for a luma block corresponding to the chroma block when the sub-block transform inheritance flag is true.

8. A method of applying intra sub-partitions (ISP) to a chroma block of a current block, performed by a video encoding apparatus, the method comprising:
acquiring a chroma format, a chroma ISP enabled flag, and a tree type from a high level, wherein the chroma format indicates relative resolution of a chroma channel with respect to a luma channel of the current block, the chroma ISP enabled flag is a flag indicating whether or not the ISP is available for the chroma block, and the tree type indicates a tree split structure for encoding of the current block;
setting chroma ISP information of the chroma block according to the tree type, the chroma format, and the chroma ISP enabled flag, wherein the chroma ISP information includes a chroma sub-block split application flag and a chroma sub-block split direction flag;
generating sub-blocks by sub-splitting the chroma block using the chroma ISP information; and
setting a transform method for the sub-blocks.

9. The method of claim 8, wherein the chroma sub-block split application flag is a flag indicating whether or not the chroma block is sub-split, and the chroma sub-block split direction flag is a flag indicating a sub-split direction of the chroma block.

10. The method of claim 8, wherein setting the chroma ISP information includes:
setting the chroma ISP information when the tree type is a single tree or a dual tree indicating the chroma channel of the current block, the chroma format is not a monochrome format, and the chroma ISP enabled flag is true.

11. The method of claim 8, further comprising:
acquiring a sub-block quad split flag indicating quad split of the chroma block from the high level,
wherein generating the sub-blocks includes:
generating sub-blocks into which the chroma block is half split or quad split according to a value of the sub-block quad split flag.

12. The method of claim 8, further comprising:
acquiring a sub-block transform inheritance flag indicating implicit transform type inheritance of the sub-blocks from the high level,
wherein setting the transform method includes:
setting a transform method for a luma block corresponding to the chroma block as a transform method for the sub-blocks when the sub-block transform inheritance flag is true.

13. A method for providing video data to a video decoding device, the method comprising:
encoding the video data into a bitstream; and
transmitting the bitstream to the video decoding device,
wherein encoding the video data comprises:
acquiring a chroma format, a chroma intra sub-partitions (ISP) enabled flag, and a tree type from a high level, wherein the chroma format indicates relative resolution of a chroma channel with respect to a luma channel of a current block, the chroma ISP enabled flag is a flag indicating whether or not an ISP is available for a chroma block, and the tree type indicates a tree split structure for encoding of the current block;
setting chroma ISP information of the chroma block according to the tree type, the chroma format, and the chroma ISP enabled flag, wherein the chroma ISP information includes a chroma sub-block split application flag and a chroma sub-block split direction flag;

generating sub-blocks by sub-splitting the chroma block using the chroma ISP information; and setting a transform method for the sub-blocks.

\* \* \* \* \*